April 6, 1926.  
W. E. DODGE  
1,579,756  
AUXILIARY VEHICLE SPRING  
Filed Jan. 9, 1922  
2 Sheets-Sheet 2
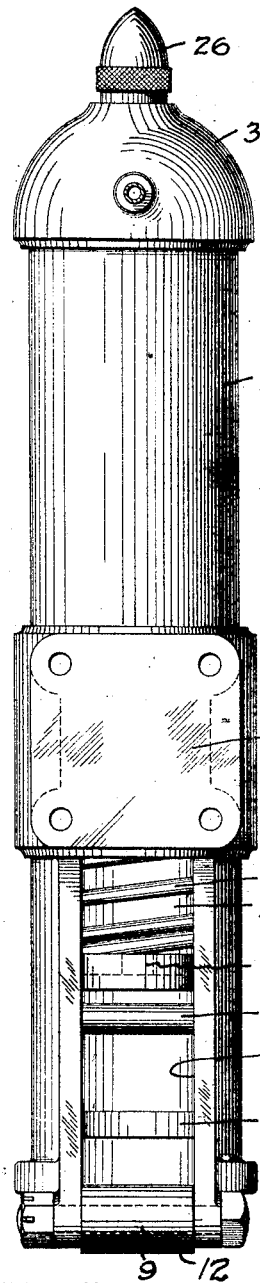
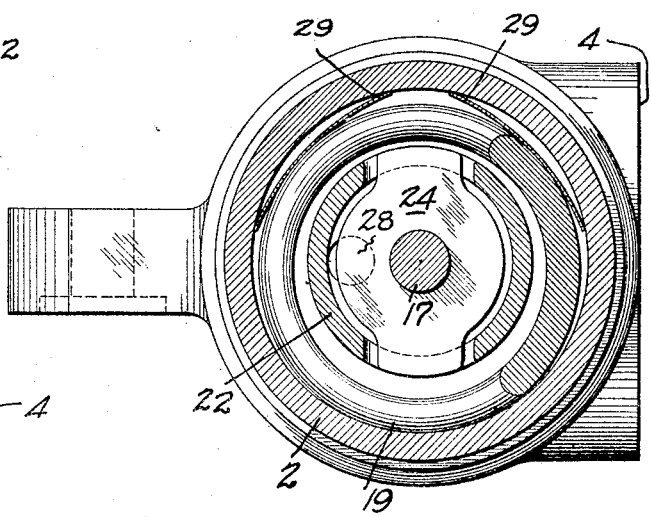
FIG.3.
FIG.4.
WITNESS  
H. Shuburn
INVENTOR  
Waldo E. Dodge.  
BY  
White Prost Evans  
his ATTORNEYS Patented Apr. 6, 1926.

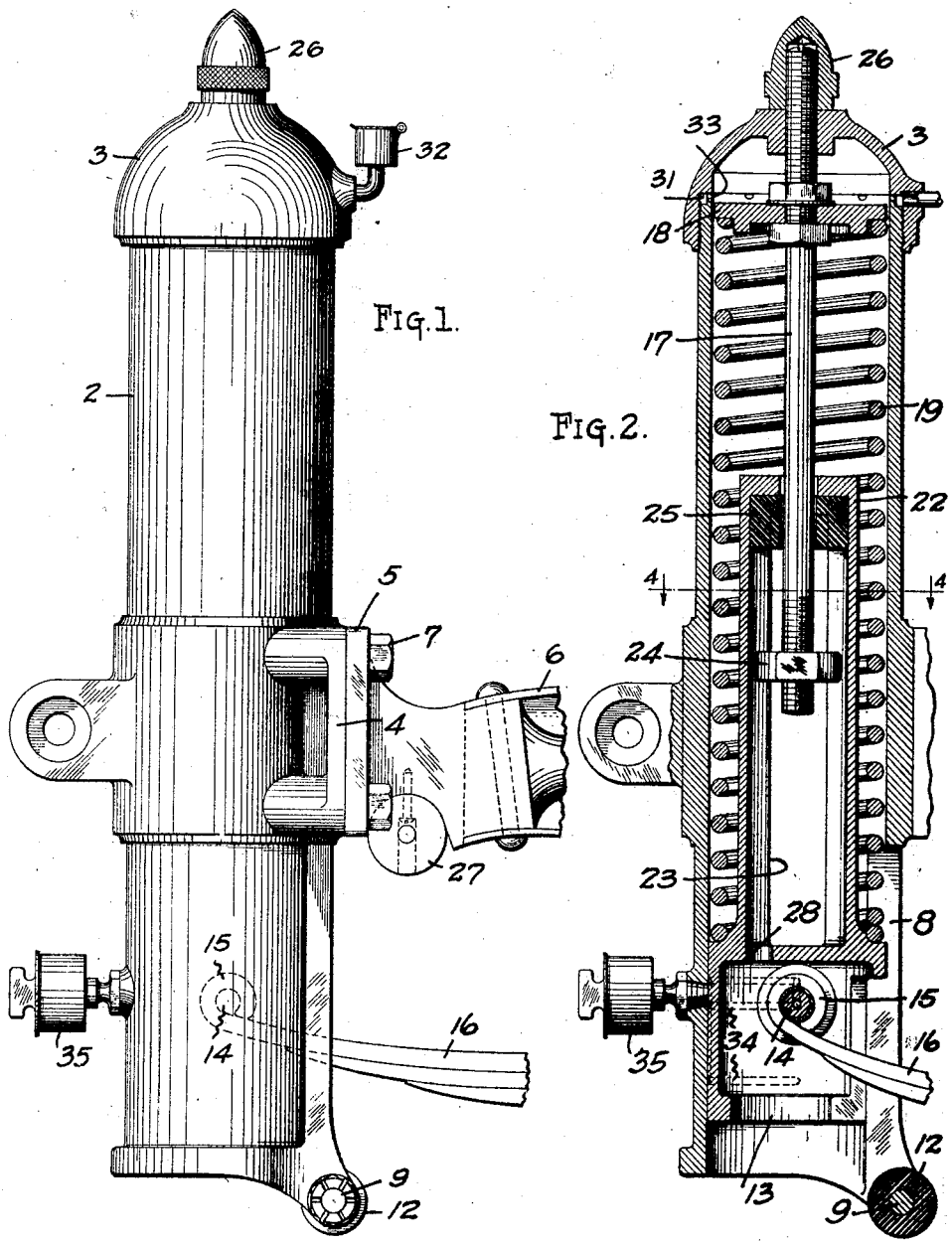

1,579,756

UNITED STATES PATENT OFFICE.

WALDO E. DODGE, OF BERKELEY, CALIFORNIA.

AUXILIARY VEHICLE SPRING.

Application filed January 9, 1922. Serial No. 528,026.

*To all whom it may concern:*

Be it known that I, WALDO E. DODGE, a citizen of the United States, and a resident of Berkeley, county of Alameda, and State of California, have invented a certain new and useful Auxiliary Vehicle Spring, of which the following is a specification.

The invention relates to auxiliary vehicle springs for vehicles, such as automobiles and motor trucks adapted to be inserted between the vehicle frame and the end of the main leaf spring.

An object of the invention is to provide an auxiliary vehicle spring which will absorb a large percentage of the shocks incurred in driving over rough and uneven surfaces.

Another object of the invention is to provide an auxiliary spring of great flexibility which is inexpensive and simple in construction.

A further object of the invention is to provide means for checking the rebound of the auxiliary springs and to provide means for adjusting the spring compression to equalize the shock absorbing effect of the two auxiliary springs constituting a pair.

The invention possesses other advantageous features, some of which, with the foregoing, will be set forth at length in the following description, where I shall outline in full, that form of the invention which I have selected for illustration in the drawings accompanying and forming part of the present specification. In said drawings I have shown one embodiment of my invention, but it is to be understood that I do not limit myself to such form, since the invention, as expressed in the claims, may be embodied in a plurality of forms.

Referring to said drawings:—

Figure 1 is a side elevation of the device of my invention interposed between the front end of an automobile frame and the front end of the main leaf spring.

Fig. 2 is a vertical section through the device.

Fig. 3 is a rear elevation of the device.

Fig. 4 is a cross section taken on the line 4—4, Fig. 2.

The auxiliary spring devices of my invention are usually employed in pairs, two at the front of the vehicle and two at the rear of the vehicle, being interposed between the ends of the vehicle frame and the outer ends of the main leaf springs, although I have obtained excellent results, using one pair of the devices installed at the front end of the vehicle only. When used in connection with automobiles, I believe it advisable to use only one pair, arranged at the front of the vehicle, but in motor truck practice, I believe two pairs of the devices should be used. It is to be understood however, that the desired number may be used in any installation, depending upon the desired results.

The device comprises an elongated tubular housing or casing 2, which may be made of steel or iron and which is closed at the top by the cap 3. Formed on the casing is a bracket or bearing plate 4 which bears against a complementary bearing plate 5 formed on or secured to the end of the vehicle frame 6, to which the casing is secured and held in an upright position by the bolts or cap screws 7. Below the bearing plate 4, the casing is provided with a wide slot or opening 8, which preferably extends to the lower end of the casing, where the slot is closed by the cross-bolt 9 surrounded by a rubber cylinder 12, which forms a bumper as will hereafter be set forth. Disposed in the casing or shell 2 at its lower end and guided therein, is a movable spring seat 13 which is slidable vertically in the casing. The movable seat is provided with a transverse pin 14 which extends through the eye 15 on the end of the main vehicle leaf spring 16.

Extending into the casing through the cap 3 and threaded therein is a long stem 17, to which, adjacent its upper end, is secured a disc 18, which provides a spring seat. Interposed between the seat 18 and the seat 13 is a long, flexible helical steel spring 19 which carries the vehicle load. I have found that the ordinary irregularities encountered on roads and streets, cause an additional load on the ends of the vehicle springs, while the vehicle is traveling, ranging from zero to 60% of the normal vehicle load on the ends of the springs and principally between 30% to 60% of said load and I find further that these irregularities vary from the normal or smooth surface of the road, through a range of from zero to five inches and principally between two inches and five inches. To secure maximum riding comfort in the vehicle, I have designed the helical springs, so that for an additional load varying from 30% to 60% of the normal load, the deflection of the springs varies from two to five inches from the normal position. The smaller shocks are therefore absorbed by the auxiliary springs and shocks in excess thereof are transferred directly to the main vehicle leaf springs. The auxiliary springs are so flexible, that when the vehicle is traveling at a moderate speed, substantially no shocks are transmitted to the vehicle frame. This result is accomplished by providing a helical spring having a free length ranging from five to eight times the outside diameter of the helix, which diameter shall not be less than three inches. In practice I have found that excellent results are obtained with a steel spring having a free length approximately six times the diameter of the helix and which has approximately twenty-one convolutions in its length and which is deflected approximately three and one-half inches from its normal position by an increased load of about 50% of the normal load on the spring.

The stem 17 extends downward in the casing, through an aperture in the top of the sleeve 22 formed integral with the movable seat. The sleeve is provided with one or more vertical slots 23, into which a nut 24 on the stem extends, so that the nut is held against rotation. Interposed between the nut and the top of the sleeve, is a rubber cushion 25, which cushions and limits the rebound of the spring. The two springs in a pair of devices may be adjusted to equalization, by rotation of the stem 17, the upper end of which is normally covered by a cap 26. Rotation of the stem varies the position of the spring seat 18 in the casing, but since the nut 24 is held against rotation, the adjustment of the spring does not vary the rebound range. The rebound range may be adjusted by disconnecting the spring 16 from the seat 13 and rotating the seat in the casing. Upward movement of the seat 13 is halted by contact of the main leaf spring with the bumper 27 mounted on the vehicle frame. Downward movement of the seat 13 is limited by the bumper 25 and the bumper 12, which latter bumper is placed in engagement with the second leaf of the main spring 16, thus preventing the entire rebound from being applied to the upper leaf only. The resilient connection between the frame and the vehicle spring preferably consists solely of the helical spring, and to avoid the compression of air in the casing, the seat 13 is preferably provided with a vent 28.

The long flexible spring has a tendency to rattle in the casing, producing objectionable noises, and I have provided means for preventing these noises. Disposed vertically in the casing, between the helical spring and the casing, are one or more flat thin springs 29, such as clock springs, which are flexed and press the helical spring against the side of the casing. I prefer to use two thin springs extending vertically of the casing and spaced apart 90°.

Means are provided for lubricating the sliding contact between the seat 13 and the interior of the casing. Formed between the cap 3 and the top of the casing, is a channel 31 with which an oil cup 32 communicates. Oil discharges from the channel through a plurality of oil holes 33 and flows down the surface of the casing, reducing the friction between the spring and the casing. At its lower end, at the zone normally occupied by the seat 13, the casing is provided with a plurality of grease grooves 34 which communicate with a grease cup 35.

I claim:

1. An auxiliary spring for vehicles adapted to be interposed between the end of the vehicle frame and the end of a vehicle main leaf spring comprising a casing adapted to be rigidly secured to the vehicle frame, a spring seat slidable in said casing and attached to the end of the leaf spring, a helical spring in said casing above said spring seat and means for pressing said spring laterally against said casing.

2. An auxiliary spring for vehicles adapted to be interposed between the end of the vehicle frame and the end of a vehicle main leaf spring comprising a casing adapted to be rigidly secured to the vehicle frame, a spring seat slidable in said casing and attached to the end of the leaf spring, a helical spring in said casing above said spring seat and vertically disposed flat springs pressing said helical spring against said casing.

3. An auxiliary spring for vehicles adapted to be interposed between the end of the vehicle frame and the end of a vehicle main leaf spring comprising a casing adapted to be rigidly secured to the vehicle frame, a spring seat slidable in said casing and attached to the end of the leaf spring, a helical spring in said casing above said spring seat, springs for forcing said helical spring against said casing to prevent lateral movement thereof and means for lubricating the inner face of the casing with which the spring contacts.

4. An auxiliary spring for vehicles adapted to be interposed between the end of the vehicle frame and the end of a vehicle main leaf spring comprising a casing adapted to be rigidly secured to the vehicle frame, a spring seat slidable in said casing and attached to the end of the leaf spring, a helical spring in said casing above said spring seat, means for disposing said helical spring against said casing to prevent rattle thereof, and means disposed at the top of said casing for distributing lubricant for gravitational flow between the casing and the contacting helical spring.

In testimony whereof, I have hereunto set my hand.

WALDO E. DODGE.